(12) United States Patent
Son et al.

(10) Patent No.: US 11,725,600 B1
(45) Date of Patent: Aug. 15, 2023

(54) METHOD OF CONTROLLING OPENING SPEED OF PURGE VALVE ACCORDING TO PURGE GAS CONCENTRATION AND ACTIVE PURGE SYSTEM THEREOF

(71) Applicants: Hyundai Motor Company, Seoul (KR); Kia Corporation, Seoul (KR)

(72) Inventors: Jung-Seop Son, Seoul (KR); Tae-Gon Noh, Seoul (KR); Hyung-Seok Yoon, Hwaseong-si (KR)

(73) Assignees: Hyundai Motor Company; Kia Corporation

( * ) Notice: Subject to any disclaimer, the term of this patent is extended or adjusted under 35 U.S.C. 154(b) by 0 days.

(21) Appl. No.: 17/899,333

(22) Filed: Aug. 30, 2022

(30) Foreign Application Priority Data

Mar. 22, 2022 (KR) .......................... 1020220035402

(51) Int. Cl.
*F02D 41/00* (2006.01)
*G05D 7/06* (2006.01)

(52) U.S. Cl.
CPC ....... *F02D 41/004* (2013.01); *F02D 41/0045* (2013.01); *G05D 7/0623* (2013.01); *F02D 2200/70* (2013.01)

(58) Field of Classification Search
CPC ............... F02D 41/004; F02D 41/0045; F02D 2200/70; G05D 7/0623
See application file for complete search history.

(56) References Cited

U.S. PATENT DOCUMENTS

| 9,669,825 | B1* | 6/2017 | Dudar .................... B60W 10/08 |
| 10,563,622 | B2 | 2/2020 | Asanuma et al. |
| 10,704,500 | B2 | 7/2020 | Asanuma et al. |
| 10,907,556 | B2 | 2/2021 | Kato et al. |
| 2010/0065030 | A1* | 3/2010 | Bellis ................... F02M 35/024 123/574 |
| 2016/0194999 | A1* | 7/2016 | Hakeem .................... F01P 7/10 123/41.04 |
| 2016/0377031 | A1* | 12/2016 | Pursifull ............ F02M 25/0836 60/602 |
| 2017/0159588 | A1 | 6/2017 | Honjo |

(Continued)

FOREIGN PATENT DOCUMENTS

| JP | 20170180314 | 10/2017 |
| JP | 20170180320 | 10/2017 |

(Continued)

*Primary Examiner* — Joseph J Dallo
(74) *Attorney, Agent, or Firm* — Fish & Richardson P.C.

(57) ABSTRACT

A method controls an opening speed of a purge valve according to the purge gas concentration implemented by an active purge system (APS). A purge controller varies, when a valve opening speed of a purge control solenoid valve (PCSV) is controlled, the valve opening speed of the PCSV using any one among a low concentration rate coefficient, a high concentration rate coefficient, a coolant temperature rate coefficient, and an ambient air temperature rate coefficient, and performs the purge control using a difference between the valve opening speeds, and thus dualizes the valve opening speed of the PCSV according to a hydrocarbon (HC) concentration, thereby stably controlling the air-fuel ratio, and simultaneously, securing the purge rate and relatively stably control an air-fuel ratio in a state of high concentration purge execution.

13 Claims, 3 Drawing Sheets

(56) References Cited

U.S. PATENT DOCUMENTS

| | | |
|---|---|---|
| 2019/0101082 A1 | 4/2019 | Sanuma et al. |
| 2019/0186393 A1 | 6/2019 | Oh et al. |
| 2019/0203666 A1 | 7/2019 | Asanuma et al. |
| 2020/0191072 A1 | 6/2020 | Ahn |
| 2020/0191085 A1 | 6/2020 | Oh |
| 2020/0208580 A1 | 7/2020 | Kato et al. |
| 2020/0217260 A1 * | 7/2020 | Dudar ................. F02D 41/0087 |

FOREIGN PATENT DOCUMENTS

| | | | |
|---|---|---|---|
| JP | 20180044544 | 3/2018 | |
| JP | 20180155135 | 4/2018 | |
| KR | 20170066011 | 6/2017 | |
| WO | WO-2004055347 A1 * | 7/2004 | ........... F01N 3/2006 |
| WO | WO-2004087496 A2 * | 10/2004 | ............. B63B 27/08 |
| WO | WO-2005103477 A1 * | 11/2005 | ........ F02D 19/0623 |
| WO | WO-2014125042 A1 * | 8/2014 | ........ F02D 41/0032 |

\* cited by examiner

<CONFIGURATION OF PURGE CONTROLLER>

METHOD OF CONTROLLING OPENING SPEED OF PURGE VALVE ACCORDING TO PURGE GAS CONCENTRATION AND ACTIVE PURGE SYSTEM THEREOF

CROSS-REFERENCE(S) TO RELATED APPLICATIONS

This application claims priority to Korean Patent Application No. 10-2022-0035402, filed on Mar. 22, 2022, which is incorporated herein by reference in its entirety.

BACKGROUND

Field of Present Disclosure

Exemplary implementations of the present disclosure relate to purge control of a vehicle, and particularly, to an active purge system which controls a purge valve opening speed according to a purge gas concentration of a valve speed dualization in which an opening speed of a purge valve is differently applied using a model concentration value of an ambient air temperature-based gas concentration model.

DESCRIPTION OF RELATED ART

Generally, since a fuel evaporative gas including hydrocarbon (HC), which is a pollutant when being discharged to the atmosphere, is generated from a fuel tank of the vehicle, fuel tank evaporative gas purge systems are applied so as to satisfy environmental regulations. In this case, an active purge system (APS) is applied to a hybrid electric vehicle (HEV) or a plug-in hybrid electric vehicle (PHEV) among vehicles.

In particular, the APS employs a canister for collecting a fuel evaporative gas generated from the fuel tank, and an active purge pump (APP) and a purge control solenoid valve (PCSV) which form a pipe line, and transfers toward an intake manifold a purge flow rate of a predetermined value or more according to an operating state of a vehicle (that is, a negative pressure of an intake manifold and a vehicle speed) under the control of a purge controller, thereby preventing the fuel evaporative gas containing HC from being discharged to the atmosphere.

To this end, valve speed type purge control uses a gas concentration model to which a value of an external concentration sensor installed outside a canister is reflected and a purge flow rate model to which a negative pressure of an intake manifold and a vehicle speed are reflected, and sets a PCSV opening speed as a valve speed to apply the PCSV opening speed to the purge control on the basis of a purge fuel amount suitable for a target air-fuel ratio, thereby implementing a relatively stable tendency in terms of a behavior of an air-fuel ratio which may occur after purge is performed.

However, in the valve speed type purge control, a setting of the PCSV opening speed applies an appropriate purge fuel amount when compared to the target air-fuel ratio on the basis of an internal combustion engine. Thus, after the purge is performed, it becomes difficult to reflect an HC concentration model in a purge gas to a purge learning value or a purge flow rate limitation.

In particular, in the valve speed type purge control, starting, engine warm-up, and a pilot fuel amount, which are air-fuel ratio variation condition in addition to a purge condition, are not excluded, and a gas concentration of the canister and an external condition such as an external temperature, which are capable of realizing an HC concentration model in the purge gas, may not be reflected. Due to the air-fuel ratio variation condition and the external condition, it is difficult to solve problems such as an unstable air-fuel ratio behavior and limiting of a purge rate after the purge is performed.

Therefore, the valve speed type purge control has a very high probability of occurrence of an error in terms of control, and thus it is inevitably insufficient to comply with regulations regulating HC in fuel evaporative gas.

SUMMARY

An implementation of the present disclosure is directed to a method of controlling an opening speed of a purge valve according to a purge gas concentration and an active purge system thereof, which dualize the opening speed of the purge valve according to a hydrocarbon (HC) concentration of an ambient air temperature-based gas concentration model to stably control an air-fuel ratio, and simultaneously, secure a purge rate, and particularly, which applies a valve speed dualization method which may relatively stably control an air-fuel ratio in the high concentration purge state by applying a low valve opening speed when HC is at a high concentration on the basis of the air temperature and an engine coolant temperature.

Other objects and advantages of the present disclosure can be understood by the following description and become apparent with reference to the implementations of the present disclosure. Also, it is obvious to those skilled in the art to which the present disclosure pertains that the objects and advantages of the present disclosure can be realized by the means as claimed and combinations thereof.

In accordance with an implementation of the present disclosure, there is provided a method of controlling an opening speed of a purge valve according to a purge gas concentration, which includes controlling, by a purge controller, purge execution of an active purge system (APS); and controlling a purge valve opening speed according to an ambient air temperature value, an engine coolant temperature value, and a hydrocarbon (HC) concentration value in a purge gas.

As an exemplary implementation, the method of controlling an opening speed of a purge valve according to a purge gas concentration may include: checking, by a purge controller, a purge execution condition of the APS; and a valve speed variable purge control operation of calculating any one among a low concentration rate coefficient to which an effect of the ambient air temperature is reflected to the HC concentration of a fuel evaporative gas, a high concentration rate coefficient to which an air-fuel ratio is reflected, a coolant temperature rate coefficient in which a temperature variable condition is not satisfied, and an ambient air temperature rate coefficient in which the temperature variable condition is satisfied, and correcting the valve opening speed of the PCSV.

As an exemplary implementation, the purge execution condition may be based on a negative pressure of an intake manifold of a vehicle and a vehicle speed in which the purge flow rate is greater than or equal to a predetermined value.

As an exemplary implementation, the valve speed variable purge control may include checking a gas concentration condition using the ambient air temperature which varies the HC concentration, applying the low concentration rate coefficient; checking an air-fuel ratio variability condition using variability of the air-fuel ratio, and applying the high concentration rate coefficient checking an external condition using the ambient air temperature and the engine coolant temperature, and applying the coolant temperature rate coefficient in a condition in which the ambient air temperature and the engine coolant temperature do not satisfy the temperature variable condition, and applying an ambient air temperature rate coefficient in a condition in which the ambient air temperature and the engine coolant temperature do not satisfy the temperature variable condition; and applying a valve opening speed control coefficient to correct the valve opening speed using any one among the low concentration rate coefficient, the high concentration rate coefficient, the coolant temperature rate coefficient, and the ambient air temperature rate coefficient.

As an exemplary implementation, the gas concentration condition may be determined by checking TRUE and FALSE of a CODEWORD #0 BIT SET, the low concentration rate coefficient may be applied in the FALSE, and the FALSE of the CODEWORD #0 BIT SET may indicate a low concentration state in which the HC concentration is lower than a reference concentration.

As an exemplary implementation, the air-fuel ratio variability condition may be determined by checking TRUE and FALSE of a CODEWORD #1 BIT SET, the high concentration rate coefficient may be applied in the FALSE, and the FALSE of the CODEWORD #1 BIT SET may indicate a high concentration state in which the HC concentration is higher than the reference concentration.

As an exemplary implementation, a setting value may be applied to each of the engine coolant temperature and the ambient air temperature, and when the engine coolant temperature or the ambient air temperature is less than the setting value, the temperature variable condition may not be satisfied, and when the engine coolant temperature or the ambient air temperature is greater than or equal to the setting value, the temperature variable condition may be satisfied.

As an exemplary implementation, the valve opening speed correction may be achieved by varying an output of a PCSV duty of the PCSV using the low concentration rate coefficient, the high concentration rate coefficient, the coolant temperature rate coefficient, and the ambient air temperature rate coefficient, and the PCSV duty may increase a valve opening speed of the low concentration rate coefficient than a valve opening speed of the high concentration rate coefficient.

In accordance with another implementation of the present disclosure, there is provided an active purge system (APS) including a purge control solenoid valve (PCSV) configured to open and close a gas discharge line which connects a canister collecting a fuel evaporative gas of a fuel tank to an intake manifold; and a purge controller configured to vary, when purge in which the PCSV is opened is executed, a valve opening speed of the PCSV using any one among a low concentration rate coefficient to which a gas concentration condition is reflected, a high concentration rate coefficient to which an air-fuel ratio variability condition is reflected, a coolant temperature rate coefficient to which conditions of an engine coolant temperature less than a setting value and an ambient air temperature are reflected, and an ambient air temperature rate coefficient to which an engine coolant temperature equal to or greater than the setting value and an ambient air temperature condition are reflected, and to perform purge control using a difference in the valve opening speed.

As an exemplary implementation, the ambient air temperature condition may use a temperature value of a temperature sensor provided in a vehicle.

As an exemplary implementation, the purge controller may include a purge concentration provider configured to compensate for a hydrocarbon (HC) concentration of a variable valve speed model on the basis of the ambient air temperature, and data on the HC concentration may be reflected to target purge together with the low concentration rate coefficient and the high concentration rate coefficient of a target purge calculator and may be reflected to an air flow rate of an air flow rate provider.

DETAILED DESCRIPTION

Exemplary implementations of the present disclosure will be described below in detail with reference to the accompanying drawings. These implementations are examples of the present disclosure and may be embodied in various other different forms by those skilled in the art to which the present disclosure pertains. Therefore, the present disclosure is not limited to these implementations.

Figure 1:
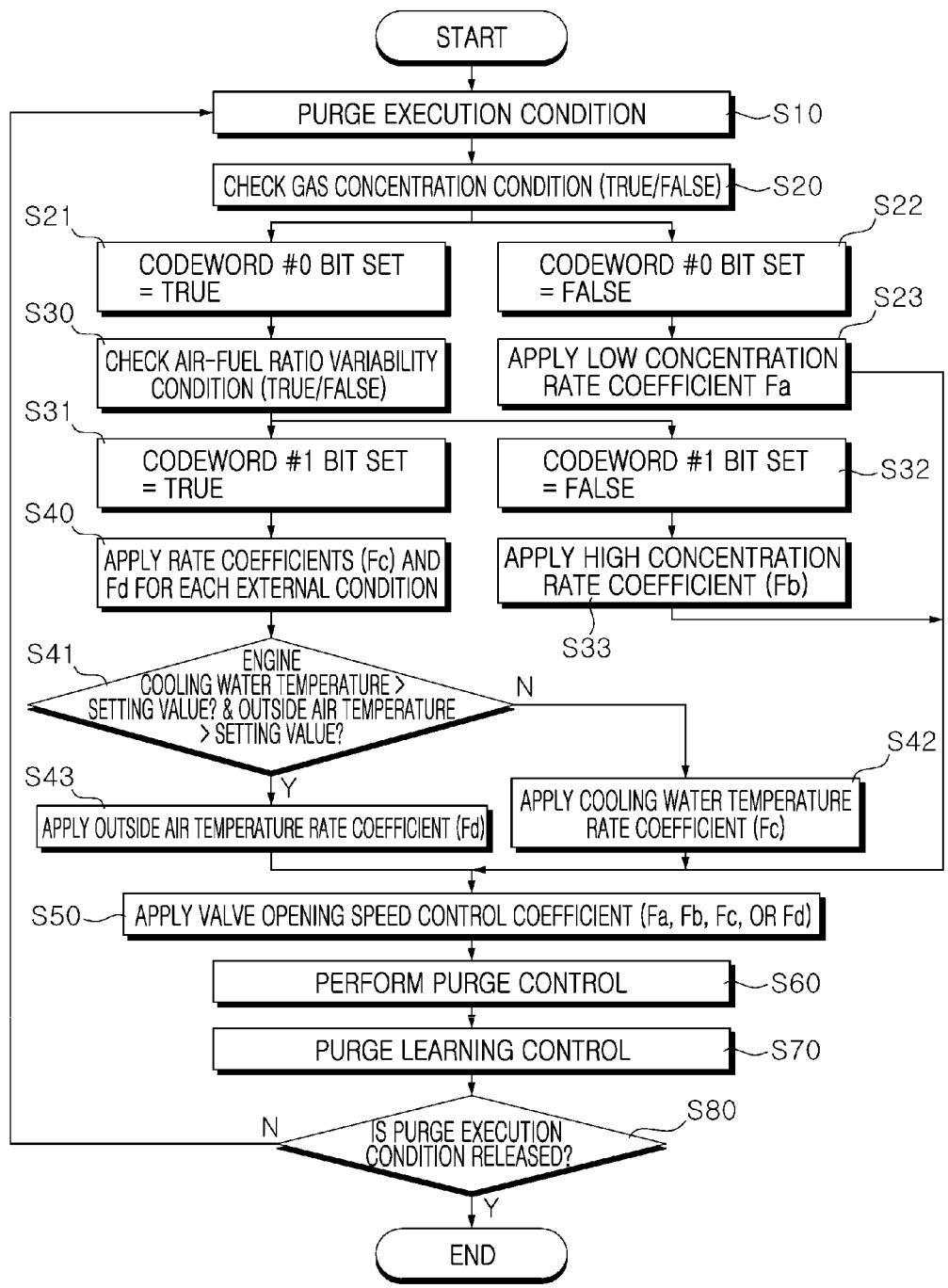
FIG. 1 is a flowchart illustrating a method of controlling an opening speed of a purge valve according to a purge gas concentration according to the present disclosure.

Referring to FIG. 1, a purge control method is characterized in that a valve opening speed applied to a purge control solenoid valve (PCSV) 6 (see FIG. 2) is variably corrected through valve speed variable purge control (S20 to S50) between purge execution condition control (S10) and purge execution condition release control (S80), purge control is performed at the variable opening speed of the PCSV 6 (see FIG. 2) (S60), and then purge learning control (S70) is performed.

In particular, in the valve speed variable purge control (S20), a set or calculated valve opening speed of the PCSV 6 (see FIG. 2) is corrected to a variable valve opening speed by applying, as a valve opening rate control coefficient, any one among a low concentration rate coefficient Fa to a gas concentration condition is reflected, a high concentration rate coefficient Fb to which an air-fuel ratio variability condition is reflected, a coolant temperature rate coefficient Fc to which a temperature variable condition of an external condition is not reflected, and an ambient air temperature rate coefficient Fd to which a temperature variable condition is reflected is applied as a valve opening rate control coefficient, and reflecting the valve opening speed control coefficient to the PCSV duty.

Therefore, in the purge control method, when high concentration purge is executed, an air-fuel ratio is stably controlled by determining a variable PCSV opening speed according to an HC concentration (that is, an HC content in a fuel evaporative gas), the coolant temperature, and the ambient air temperature. In this way, a PCSV opening speed logic based on the existing internal combustion engine, which is set to be controlled according to the amount of fuel injected into an engine combustion chamber, is controlled to open and close the PCSV regardless of an actual purge gas concentration. Thus, the PCSV opening speed logic is characterized by a purge valve opening speed control method according to the purge gas concentration on the basis of a dualized valve speed method in which the air-fuel ratio stability is secured in a high concentration purge execution state.

Figure 2:
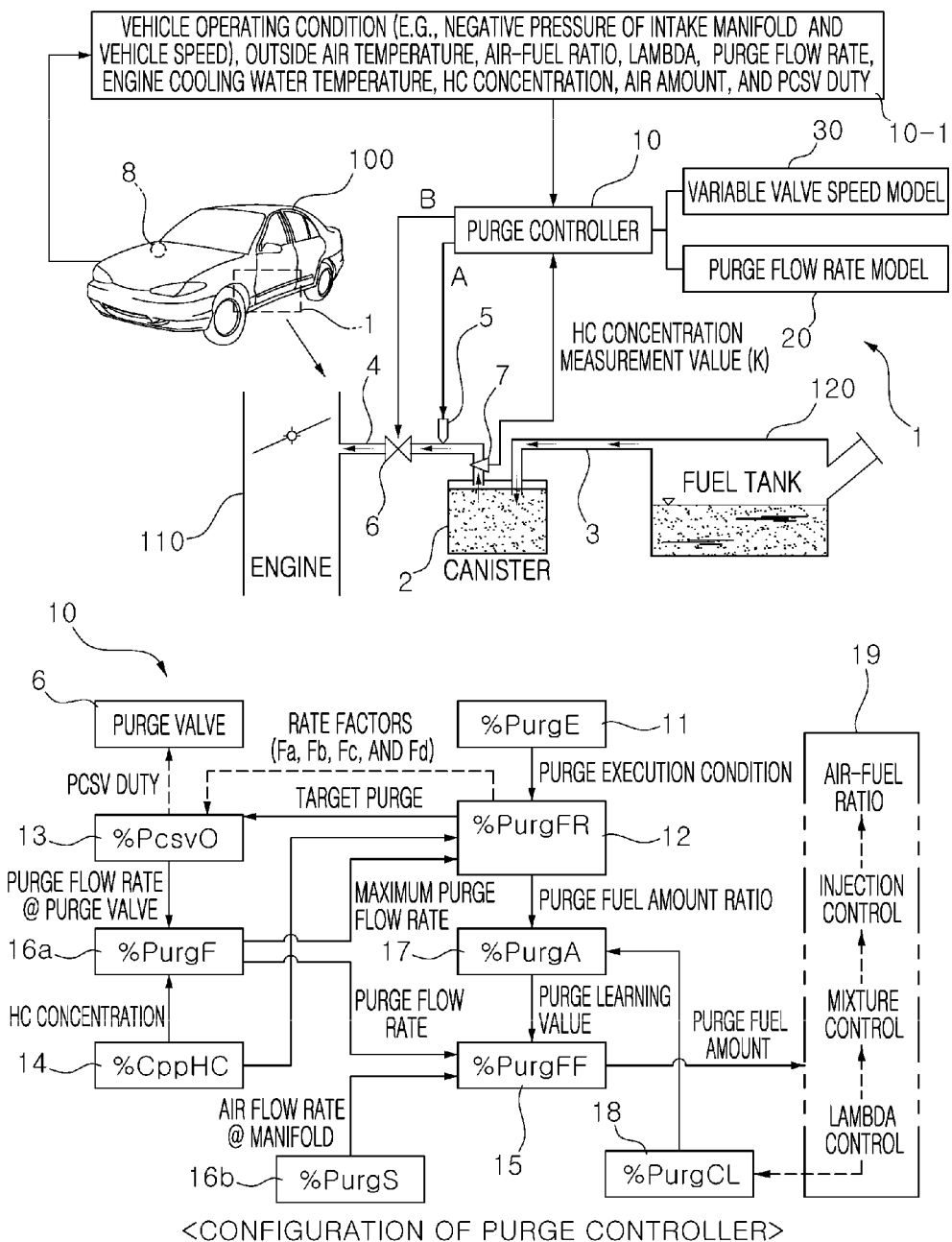
FIG. 2 is a block diagram illustrating an active purge system of a vehicle according to the present disclosure.

Referring to FIG. 2, an APS 1 connects an intake manifold 110 of a vehicle 100 to a fuel tank 120 thereof and transfers a fuel evaporative gas of the fuel tank 120 to the intake manifold 110 to combust the fuel evaporative gas. In this case, examples of the vehicle 100 include an internal combustion engine vehicle, an HEV, and a PHEV.

Specifically, the APS 1 includes, as basic hardware components, a canister 2 connected to the fuel tank 120 through a gas inlet line 3 and configured to collect a fuel evaporative gas and transfer the fuel evaporative gas to the intake manifold 110 through a gas discharge line 4, an active purge pump (APP) 5 configured to rotate to discharge the fuel evaporative gas from the canister 2, a PCSV 6 opened and closed to form a flow path of the fuel evaporative gas, and a concentration sensor 7 configured to detect an HC concentration value in the fuel evaporative gas, and includes a temperature sensor 8, a purge controller 10, a purge flow rate model 20, and a variable valve speed model 30. In this case, the variable valve speed model 30 is a gas concentration model which is established on the basis of an HC concentration measurement value K of the concentration sensor 7.

As an example, the APP 5, the PCSV 6, and the concentration sensor 7 are general components installed on the gas discharge line 4. However, there is a difference in that, while the number of rotations of the APP 5 due to a pump output A of the purge controller 10 and an opening speed of the PCSV 6 due to a PCSV duty variation output B are variably controlled, the HC concentration measurement value K of the concentration sensor 7 and a PCSV duty value are transmitted to the purge controller 10 and applied to the variable valve speed model 30.

As an example, the temperature sensor 8 is installed in the vehicle 100 and detects an air temperature around the vehicle as the ambient air temperature, and transmits the ambient temperature to the purge controller 10.

As an example, the purge controller 10 reads input data 10-1 for control conditions for the APP 5 and the PCSV 6 and reads model values of the purge flow rate model 20 and the variable valve speed model 30 for the purge control and the varying of the PCSV duty. In this case, the input data 10-1 detects a vehicle operating state, a negative pressure of the intake manifold by which an air temperature and a degree of a purge flow rate are known, a vehicle speed, the ambient air temperature, the air-fuel ratio, lambda, the purge flow rate, the engine coolant temperature, the HC concentration, an air amount, and the PCSV duty from the vehicle 100 and the APS 1, and various sensors for detection are provided in the vehicle as basic mounting sensors.

Therefore, the purge controller 10 includes a memory which stores a program or a logic for performing purge execution/release condition control (S10 and S80)/the valve speed variable purge control (S20 to S50)/the purge control (S60)/the purge learning control (S70), and serves as a central processing unit which performs mutual communication using a controller area network (CAN). In this case, the CAN communication includes a bit set of TRUE and FALSE.

As an example, the purge flow rate model 20 constructs, as a table map, a purge flow rate value based on the negative pressure of the intake manifold and the vehicle speed by which an operating state of the vehicle is known, and provides the purge controller 10 with a purge flow rate required for the purge control, and the variable valve speed model 30 constructs, as a table map, a model concentration value based on the HC concentration measurement value K of the concentration sensor 7, and provides the purge controller 10 with a PCSV variable duty value together with a model concentration value corrected due to the ambient air temperature of the temperature sensor 8.

Specifically, the purge controller 10 includes a purge condition confirmation part 11, a target purge calculator 12, a target purge provider 13, a purge concentration provider 14, a purge fuel amount calculator 15, a purge flow rate provider 16a, an air flow rate provider 16b, a purge learning value provider 17, a purge learning calculator 18, and a purge information provider 19, and performs purge fuel amount correction type purge control through an interaction between the above components. In this case, a data exchange is performed through the CAN.

Thus, the components of the purge controller 10 may be divided into providing blocks 11, 13, 14, 16a, 16b, and 17 and calculation blocks 12, 15, and 18. In this case, each of the calculation blocks 12, 15, and 18 is specifically exemplified by the generated processing result, but the generated processing result is not limited to unique functions of the calculation blocks 12, 15, and 18 and may be complementary to each other to produce processed results.

As an example, the purge condition confirmation part 11 provides the target purge calculator 12 with the negative pressure of the intake manifold and the vehicle speed, which are the purge execution conditions, of the input data 10-1, the target purge provider 13 provides a target purge of the target purge calculator 12 to the purge flow rate provider 16a, and provides the PCSV 6 with, as the PCSV duty, a valve speed corrected using the rate factors Fa, Fb, Fc, and Fd, and the purge concentration provider 14 provides the target purge calculator 12, the purge flow rate provider 16a, and the air flow rate provider 16b with, as the HC concentration, a model concentration value, to which the ambient air temperature is reflected. In this case, the purge concentration provider 14 may provide the HC concentration to the purge fuel amount calculator 15.

In addition, the purge flow rate provider 16a provides a maximum purge flow rate to the target purge calculator 12, and provides the purge flow rate to the purge fuel amount calculator 15, the air flow rate provider 16b provides the purge fuel amount calculator 15 with the air flow rate based on the HC concentration of the purge concentration provider 14, the purge learning value provider 17 provides the purge fuel amount calculator 15 with a purge learning value, to which the purge fuel amount ratio of the target purge calculator 12 and the purge learning condition of the purge learning calculator 18 are reflected, and the purge information provider 19 secures a purge performance result according to the purge fuel amount of the purge fuel amount calculator 15. In this case, the purge information provider 19 includes, as information, such as mixture control, an injection calculation, lambda control, and an air-fuel ratio.

As an example, in the purge execution condition, the target purge calculator 12 calculates the rate coefficients Fa, Fb, Fc, and Fd as a target purge flow rate and low concentration rate coefficient Fa/a high concentration rate coefficient Fb/a coolant temperature rate coefficient Fc/an ambient air temperature rate coefficient Fd at a concentration purge flow rate based on the ambient air temperature application model concentration value of the purge concentration provider 14 and a maximum purge flow rate of the purge flow rate provider 16a.

In addition, the purge fuel amount calculator 15 calculates the purge fuel amount using the purge flow rate of the purge flow rate provider 16a and the HC concentration of the purge concentration provider 14, and the purge learning calculator 18 applies the air-fuel ratio variation condition among the purge performance results of the purge information provider 19 and determines and outputs a purge learning condition on the basis of a vehicle operating state or a purge learning condition on the basis of an air-fuel ratio variation factor. In this case, the purge fuel amount calculator 15 may use the ambient air temperature reflected model concentration value of the purge concentration provider 14.

Therefore, the target purge calculator 12 receives pieces of data from the purge condition confirmation part 11, the purge concentration provider 14, and the purge flow rate provider 16a and provides processed results to the target purge provider 13 and the purge learning value provider 17. The target purge provider 13 receives data from the target purge calculator 12 and provides a processed result to the PCSV 6 and the purge flow rate provider 16a. The purge concentration provider 14 provides a processed result to the target purge calculator 12, the purge fuel amount calculator 15, and the purge flow rate provider 16a. In this case, the processed result may be data itself or processed data.

In addition, the purge fuel amount calculator 15 receives data from the air flow rate provider 16b and the purge learning value provider 17 and provides the purge fuel amount to the purge information provider 19 as a processed result. The purge flow rate provider 16a receives data from the target purge provider 13 and the purge concentration provider 14 and provides the processed result to the target purge calculator 12 and the purge fuel amount calculator 15. The air flow rate provider 16b receives data from the purge concentration provider 14 and provides the data to the purge fuel amount calculator 15. In this case, the processed result may be data itself or processed data.

In addition, the purge learning value provider 17 receives data from the target purge calculator 12 and the purge learning calculator 18 and provides a processed result to the purge fuel amount calculator 15. The purge learning calculator 18 receives data from the purge information provider 19 and provides a processed result to the purge learning value provider 17. The purge information provider 19 includes mixture control, an injection calculation, lambda control, and an air-fuel ratio as information and provides a lambda value of the lambda control to the purge learning calculator 18. In this case, the processed result may be data itself or processed data.

In particular, when a purge concentration and an ambient air temperature are high, the purge fuel amount calculator 15 may set the purge fuel amount to be large, whereas, when the purge concentration and the ambient air temperature are low, the purge fuel amount calculator 15 may set the purge fuel amount to be small.

Therefore, the purge control of the purge controller 10 dualizes the PCSV opening speed according to the HC concentration condition of the variable valve speed model 30, which is the purge gas concentration model, and reflects the conditions of the ambient air temperature and the engine coolant temperature to the HC concentration, thereby controlling the PCSV opening speed in more detail. In particular, with the dualization of the PCSV opening speed, the purge control of the purge controller 10 sets the PCSV opening speed according to a fuel amount suitable for the target air-fuel ratio in a logic formed based on the existing internal combustion engine, thereby solving a problem in which the HC concentration is difficult to reflect.

Hereinafter, a method of controlling an opening speed of a purge valve according to a purge gas concentration on the basis of a valve speed dualizing method of FIG. 1 will be described in detail with reference to FIGS. 2 and 3. In this case, a control main body is the purge controller 10, and a control target is the APP 5 and the PCSV 6.

First, the purge controller 10 performs the purge execution condition control (S10) and applies a purge flow rate equal to or greater than a predetermined value according to a negative pressure of the intake manifold and the vehicle speed of the input data 10-1 (see FIG. 2) by which an operating state of a vehicle is known. In this case, the purge flow rate equal to or greater than the predetermined value is the same as that of a purge control condition of an APS applied to internal combustion engine vehicles, particularly, an HEV and a PHEV.

Then, the purge controller 10 performs the valve speed variable purge control (S20 to S50) through checking a gas concentration condition (S20), applying the low concentration rate coefficient (S21 to S23), checking an air-fuel ratio variability condition (S30), applying the air-fuel ratio rate coefficient (S31 to S33), checking external conditions (S40), applying a rate coefficient for each external condition (S41 to S43), and applying a valve opening speed control coefficient for varying the PCSV duty (S50).

As an example, the checking of the gas concentration condition (S20) divides a CODEWORD BIT SET into TRUE and FALSE, and in the FALSE, the procedure is switched to the applying of the low concentration rate coefficient (S21 to S23), whereas in the TRUE, the procedure executes the checking of the air-fuel ratio variability condition (S30). In addition, the checking of the air-fuel ratio variability condition (S30) divides a CODEWORD BIT SET into TRUE and FALSE, and in the FALSE, the procedure is switched to applying the high concentration rate coefficient (S31 to S33), whereas in the TRUE, the procedure executes the checking of the external conditions (S40).

In particular, the TRUE and FALSE of the CODEWORD BIT SET are based on the ambient air temperature value of the temperature sensor 8 which indirectly affects the purge concentration, a CODEWORD BIT SET=TRUE is generated at a purge concentration change ambient air temperature reference value or high, and a CODEWORD BIT SET=FALSE is generated less than the purge concentration change ambient air temperature reference value. In this case, the purge concentration change ambient air temperature reference value may be set through a difference between the HC concentration value of the concentration sensor 7 and an HC concentration value estimated from the ambient air temperature.

Therefore, during the checking of the gas concentration condition (S20), the applying of the low concentration rate coefficient (S21 to S23) in the FALSE is performed through checking a CODEWORD #0 BIT SET=TRUE (S21), or checking the CODEWORD #0 BIT SET=FALSE (S22), and calculating a low concentration rate coefficient Fa which rapidly varies the PCSV duty (S23). In addition, during the checking of the air-fuel ratio variability condition (S30), the applying of the high concentration rate coefficient (S31 to S33) in the FALSE is performed through checking a CODEWORD #1 BIT SET=TRUE (S31), or checking the CODEWORD #1 BIT SET=FALSE (S32), and calculating a high concentration rate coefficient Fb which slowly varies the PCSV duty (S33). In this case, the codeword is a bit set for determining a path of a logic. For example, when a #0 bit of the codeword is a set (TRUE) according to the setting, the logic proceeds to path A, and when the #0 bit of the codeword is a set X (FALSE), the logic proceeds to path B.

Referring to FIG. 2, the purge controller 10 performs the applying of the low concentration rate coefficient (S21 to S23) such that the purge flow rate model value of the purge flow rate model 20 is checked, and the target purge calculator 12 which calculates the target purge provides the purge learning value provider 17 with a purge fuel amount ratio, to which a maximum purge flow rate of the purge flow rate provider 16a is applied according to a low HC concentration of the purge concentration provider 14, and provides the target purge provider 13 with the low concentration rate coefficient Fa, to which the low HC concentration of the purge concentration provider 14 is applied. In this case, the HC concentration and the purge flow rate may be provided as information of the input data 10-1.

In addition, the purge controller 10 performs the applying of the high concentration rate coefficient application (S31 to S33) such that the target purge calculator 12 provides the target purge provider 13 with the air-fuel ratio according to the purge control of the purge information provider 19 or the high concentration rate coefficient Fb, to which the air-fuel ratio information of the input data 10-1 is applied.

Figure 3:
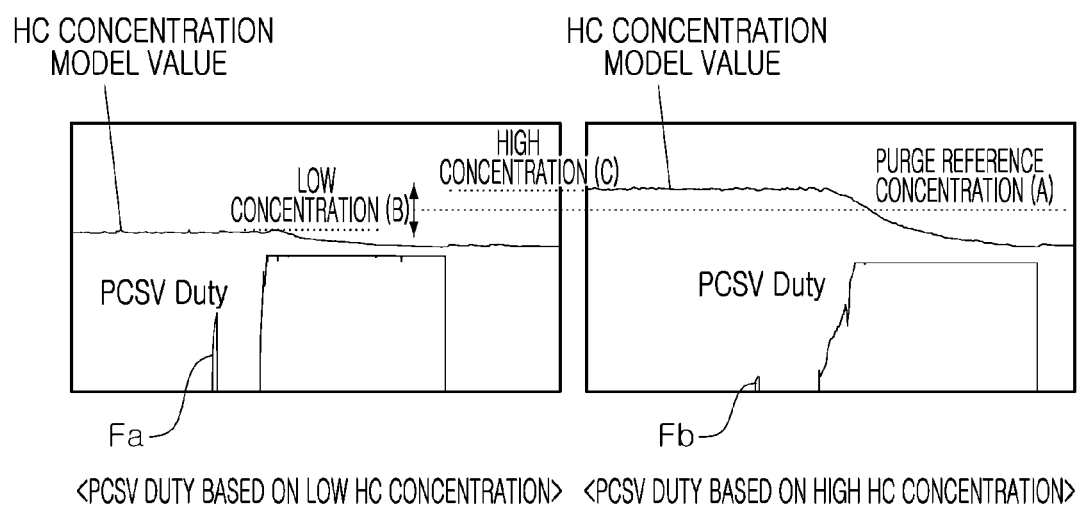
FIG. 3 is an example of a purge control solenoid valve (PCSV) duty output based on a hydrocarbon (HC) low concentration and a PCSV duty output based on an HC high concentration according to the present disclosure.

Referring to FIG. 3, the purge controller 10 divides a low concentration B and a high concentration C based on a purge reference concentration A. To this end, the purge controller 10 applies low HC concentration determination having a condition of "HC concentration<predetermined concentration" and high HC concentration determination having a condition of "HC concentration>predetermined concentration." In this case, the "predetermined concentration" is the purge reference concentration A and is the HC concentration value which is normally required to apply the purge control to a fuel evaporative gas, and "< and >" are inequality signs indicating a magnitude relationship between two values.

For example, the checking of the external conditions (S40) applies a temperature variable so as to distinguish the speed coefficients Fc and Fd for each external condition, and the applying of the rate coefficient for each external condition (S41 to S43) is performed through determining a temperature variable condition using the engine coolant temperature and the ambient air temperature (S41), calculating the coolant temperature rate coefficient Fc, which variably changes the PCSV duty according to the engine coolant temperature, when the temperature variable condition is not satisfied (S42), and calculating the ambient air temperature rate coefficient Fd, which variably changes the PCSV duty according to the HC concentration when the temperature variable condition is satisfied (S43).

Referring to FIG. 2, the purge controller 10 performs the applying of the rate coefficient for each external condition (S41 to S43) such that the target purge calculator 12 calculating the target purge provides the target purge provider 13 with the coolant temperature rate coefficient Fc or the ambient air temperature rate coefficient Fd using, as a predetermined value condition, the engine coolant temperature and the ambient air temperature which are provided through the purge condition provider 11 among pieces of information of the input data 10-1.

To this end, determination of the temperature variable condition applies (engine coolant temperature>setting value & ambient air temperature>setting value), the "setting value" is an engine HOT state of an engine warm-up temperature or high using a predetermined coolant temperature, the "setting value" is a high ambient air temperature value with a difference between a detected HC concentration value of the concentration sensor 7 and a predicted HC concentration value based on the ambient air temperature using a predetermined ambient air temperature, and ">" is an inequality sign indicating a magnitude relationship between two values.

In this way, the purge controller 10 may dualize a PCSV opening speed map (MAP) according to the HC concentration condition using a valve speed variable logic and a valve speed factor reflection logic of the purge concentration provider 14, and may control the opening speed by the MAP using, as inputs, the ambient air temperature, the engine coolant temperature, and the HC concentration.

Finally, the applying of the valve opening speed control coefficient (S50) includes calculating a high speed PCSV duty corresponding to the low HC concentration of the low concentration rate coefficient Fa, calculating a low speed PCSV duty corresponding to the high HC concentration of the high concentration rate coefficient Fb, calculating a medium and high speed PCSV duty corresponding to a normal engine condition of the coolant temperature rate coefficient Fc and a high ambient air temperature or less and calculating a medium and low speed PCSV duty corresponding to the engine HOT state of the ambient air temperature rate coefficient Fd and the high ambient air temperature.

Therefore, the purge controller 10 may control the PCSV 6 using a PCSV duty satisfying a first valve opening speed of the high speed PCSV duty, a second valve opening speed of the low speed PCSV duty, a third valve opening speed of the medium and high speed PCSV duty, and a fourth valve opening speed of medium and low speed PCSV duty.

For example, the valve opening speeds may be set as the first valve opening speed>the third valve opening speed>the fourth valve opening speed>the second valve opening speed or the first valve opening speed>the second valve opening speed>the third valve opening speed>the fourth valve opening speed.

Subsequently, the purge controller 10 performs the purge control (S60) at any one among the first, second, third, and fourth valve opening speeds using a PCSV output B of the variable opening speed (see FIG. 2), and performs the purge learning control (S70) using feedback of the purge control result. In this case, the purge learning control (S70) applies the purge learning condition based on the vehicle operating state, and performs purge learning by applying the PCSV duty, the engine warm-up, and the target air-fuel ratio, thereby updating a purge learning value according to the air-fuel ratio.

Referring to FIG. 3, the first valve opening speed increases the opening speed of the PCSV 6 according to the low concentration B using the PCSV duty based on the low HC concentration based on the low concentration rate coefficient Fa, whereas the second valve opening speed relatively decreases the opening speed of the PCSV 6 according to the high concentration C using the PCSV duty based on the high HC concentration based on the high concentration rate coefficient Fb. In this case, the increased opening speed and the decreased opening speed may have about 20 to 30% speed difference.

As described above, the map (MAP) of the purge controller 10 dualizes the HC concentration into the low concentration B and the high concentration C with respect to the purge reference concentration A and, like the existing logic, a PCSV opening speed determination logic maintains the PCSV opening speed at a constant speed according to the HC concentration, the engine coolant temperature, and the ambient air temperature regardless of the HC concentration. Therefore, when high concentration purge is executed, it is possible to prevent occurrence of instability of the air-fuel ratio and stably control the air-fuel ratio.

As described above, the method of controlling an opening speed of a purge valve according to the purge gas concentration, implemented by the APS 1 according to the present implementation varies, when the valve opening speed of the PCSV 6 is controlled according to the purge execution of the APS 1, the valve opening speed of the PCSV 6 using any one among the low concentration rate coefficient Fa to which the gas concentration condition is reflected, the high concentration rate coefficient Fb to which the air-fuel ratio variability condition is reflected, the coolant temperature rate coefficient Fc to which the conditions of the engine coolant temperature less than a setting value and the ambient air temperature are reflected, and the ambient air temperature rate coefficient Fd to which the engine coolant temperature equal to or greater than a setting value and the ambient air temperature condition are reflected, and performs the purge control using a difference between the valve opening speeds. Thus, the method may dualize the valve opening speed of the PCSV 6 according to the HC concentration, thereby stably controlling the air-fuel ratio, and simultaneously, securing the purge rate. In particular, in the high HC concentration based on the ambient air temperature and the engine coolant temperature, the method may apply the decreased valve opening speed, thereby relatively stably controlling an air-fuel ratio in a state of a high concentration purge execution.

The purge control of the active purge system (APS) of the present disclosure implements the following actions and effects.

First, opening/closing control of a purge valve (purge control solenoid valve (PCSV)) can be performed at a variable valve opening speed to which a model value of an ambient air temperature-based gas concentration model is reflected. Second, due to dualization of the opening speed of the purge valve according to a hydrocarbon (HC) concentration of the model value, an air-fuel ratio may be stabilized, and simultaneously, a purge rate can be secured. Third, in a high HC concentration based on an ambient air temperature and an engine coolant temperature, a low valve opening speed is applied so that it is possible to relatively stably control an air-fuel ratio even in a high concentration purge execution. Fourth, since the ambient air temperature is reflected to the gas concentration model, it is possible to perform more effective purge control in a hybrid electric vehicle (HEV) and a plug-in hybrid electric vehicle (PHEV), in which the HC concentration can be estimated on the basis of the ambient air temperature, among vehicles.

While the present disclosure has been described with reference to the accompanying drawings, it will be apparent to those skilled in the art that various changes and modifications can be made without departing from the spirit and scope of the present disclosure without being limited to the exemplary implementations disclosed herein. Accordingly, it should be noted that such alternations or modifications fall within the claims of the present disclosure, and the scope of the present disclosure should be construed on the basis of the appended claims.

What is claimed is:

1. A method for controlling a purge valve of a vehicle, the method comprising:
    controlling, by a purge controller, purge execution of an active purge system (APS); and
    performing a valve speed variable purge control that controls a valve opening speed of the purge valve based on an ambient air temperature, an engine coolant temperature, and a hydrocarbon (HC) concentration in a purge gas.

2. The method of claim 1, wherein controlling the purge execution comprises:
    determining whether to perform the purge execution based on (i) a negative pressure of an intake manifold of the vehicle and (ii) a vehicle speed in which a purge flow rate is greater than or equal to a predetermined value.

3. The method of claim 1, wherein performing the valve speed variable purge control comprises:
    determining whether a gas concentration condition is satisfied based on the ambient air temperature;
    based on a determination whether the gas concentration condition is satisfied, applying a low concentration rate coefficient corresponding to the HC concentration that is varied by an influence of the ambient air temperature;
    determining whether an air-fuel ratio variability condition is satisfied based on a variability of a ratio of air and fuel that are provided to an engine of the vehicle;
    based on a determination whether the air-fuel ratio variability condition is satisfied, applying a high concentration rate coefficient corresponding to the air-fuel ratio;
    determining whether an external condition is satisfied based on the ambient air temperature and the engine coolant temperature, the external condition comprising a temperature variable condition that is determined based on the ambient air temperature and the engine coolant temperature;
    applying a coolant temperature rate coefficient based on a determination that the ambient air temperature and the engine coolant temperature do not satisfy the temperature variable condition;
    applying an ambient air temperature rate coefficient based on a determination that the ambient air temperature and the engine coolant temperature satisfy the temperature variable condition; and
    applying a valve opening speed control coefficient to thereby adjust the valve opening speed of the purge valve based on any one among the low concentration rate coefficient, the high concentration rate coefficient, the coolant temperature rate coefficient, or the ambient air temperature rate coefficient.

4. The method of claim 3, wherein determining whether the gas concentration condition is satisfied comprises:
    checking whether a CODEWORD #0 BIT SET in the purge controller is TRUE or FALSE, and
    wherein the low concentration rate coefficient is applied based on the CODEWORD #0 BIT SET being FALSE.

5. The method of claim 4, wherein FALSE of the CODEWORD #0 BIT SET indicates that the HC concentration corresponds to a low concentration lower than a reference concentration.

6. The method of claim 3, wherein determining whether the air-fuel ratio variability condition is satisfied comprises:
    checking a CODEWORD #1 BIT SET in the purge controller is TRUE or FALSE, and
    wherein the high concentration rate coefficient is applied based on the CODEWORD #1 BIT SET being FALSE.

7. The method of claim 6, wherein FALSE of the CODEWORD #1 BIT SET indicates that the HC concentration corresponds to a high concentration higher than a reference concentration.

8. The method of claim 3, further comprising:
    comparing the engine coolant temperature to a first setting value;
    comparing the ambient air temperature to a second setting value;

based on the engine coolant temperature being less than the first setting value or the ambient air temperature being less than the second setting value, determining that the temperature variable condition is not satisfied; and based on the engine coolant temperature being greater than or equal to the first setting value or the ambient air temperature being greater than or equal to the second setting value, determining that the temperature variable condition is satisfied.

9. The method of claim 3, wherein the purge valve comprises a purge control solenoid valve (PCSV), wherein the method further comprises:
adjusting the valve opening speed by varying an output of a PCSV duty of the PCSV based on the low concentration rate coefficient, the high concentration rate coefficient, the coolant temperature rate coefficient, and the ambient air temperature rate coefficient.

10. The method of claim 9, further comprising:
increasing the PCSV duty to thereby increase the valve opening speed corresponding to the low concentration rate coefficient to be greater than the valve opening speed corresponding to the high concentration rate coefficient.

11. An active purge system (APS), comprising:
a fuel tank configured to accommodate fuel;
a canister configured to receive fuel evaporative gas from the fuel tank;
a gas discharge line that connects the canister to an intake manifold;
a purge control solenoid valve (PCSV) configured to open and close the gas discharge line; and
a purge controller configured to:
based on executing a purge operation of the PCSV to open the PCSV, vary a valve opening speed of the PCSV based on any one among (i) a low concentration rate coefficient determined based on whether a gas concentration condition is satisfied, (ii) a high concentration rate coefficient determined based on whether an air-fuel ratio variability condition is satisfied, (iii) a coolant temperature rate coefficient determined based on an ambient air temperature and an engine coolant temperature that is less than a setting value, or (iv) an ambient air temperature rate coefficient determined based on an ambient air temperature condition and the engine coolant temperature that is greater than or equal to the setting value, and
perform a purge control based on a difference in the valve opening speed.

12. The APS of claim 11, wherein the ambient air temperature condition is determined based on a temperature value of a temperature sensor of a vehicle.

13. The APS of claim 11, wherein the purge controller is configured to:
compensate for a hydrocarbon (HC) concentration of a variable valve speed model based on the ambient air temperature; and
based on data of the HC concentration, determine (i) a target purge together with the low concentration rate coefficient and the high concentration rate coefficient and (ii) an air flow rate at the intake manifold.

* * * * *